Patented Jan. 4, 1938

2,104,348

UNITED STATES PATENT OFFICE 2,104,348

INDAZOLONES

John Lee, Zurich, Switzerland, assignor to E. R. Squibb & Sons, New York, N. Y., a corporation of New York No Drawing. Application June 3, 1933, Serial No. 674,218

4 Claims. (Cl. 260—45)

This invention relates to, and has for its object the provision of, indazolones of the general formula 1—R 2-phenyl 5—X 6—Y 7—Z 4,5,6,7-tetrahydro indazolone-3,

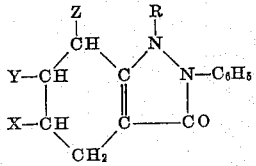

where X represents hydrogen or an alkyl, Y represents hydrogen or an alkyl, Z represents hydrogen or an alkyl; and R represents an alkyl, an alkenyl, or a substituted alkyl or alkenyl, when Y is methyl or when X, Y, and Z are all hydrogen, but otherwise represents hydrogen, an alkyl, an alkenyl, or a substituted alkyl or alkenyl.

Example 1

1-methyl 2-phenyl 4,5,6,7-tetrahydro indazolone-3

14.4 g. 2-phenyl 4,5,6,7-tetrahydro indazolone-3 (Dieckman, Annalen 317, 102) is dissolved in a solution of 8 g. potassium hydroxide in 40 cc. water; the solution is cooled to 12° C. and maintained thereat for 1½ hours and 11.35 g. methyl sulfate is added dropwise during that period; the reaction product is extracted with ether and dried and the solvent is removed, leaving the compound sought, as 7.5 g. of an oil distilling at 208–210° C./4 mm. and when recrystallized from n-hexane, melting at 105.5–106.5° C.

Example 2

1-ethyl 2-phenyl 4,5,6,7-tetrahydro indazolone-3

30 g. 2-phenyl 4,5,6,7-tetrahydro indazolone-3 is dissolved in a solution of 16.7 g. potassium hydroxide in 80 cc. water, and the solution is treated, in the manner of Example 1, with 29.8 g. diethyl sulfate; the reaction product on extraction with ether and recrystallization from n-hexane, yields 7.0 g. of the compound sought, melting at 108–110° C.

Example 3

1,6-dimethyl 2-phenyl 4,5,6,7-tetrahydro indazolone-3

11.4 g. 2-phenyl 6-methyl 4,5,6,7-tetrahydro indazolone-3 (Kotz, Annalen 342, 322) is dissolved in a solution of 5.6 g. potassium hydroxide in 20 cc. water, and the solution is treated, in the manner of Example 1, with 8.0 g. methyl sulfate; the reaction product, on extraction with ether and recrystallization from n-hexane, yields 4.5 g. of the compound sought, melting at 105–106° C.

Example 4

2-phenyl 5-methyl 4,5,6,7-tetrahydro indazolone-3

8.8 g. 3-methyl 6-cyclohexanone 1-carboxylic ethyl ester (Kotz and Michels, Annalen 348, 95) is warmed with 11.1 g. phenyl hydrazine for several hours on a water-bath at 70–100° C.; the reaction product, on being washed with ether and recrystallized from methyl alcohol, yields 18.8 g. of the compound sought, melting at 198–201° C.

Example 5

1,5-dimethyl 2-phenyl 4,5,6,7-tetrahydro indazolone-3

18.5 g. 2-phenyl 5-methyl 4,5,6,7-tetrahydro indazolone-3 is dissolved in a solution of 9.4 g. potassium hydroxide in 36 cc. water. To the solution, cooled at 12° C., 13.05 g. (a 5% excess) methyl sulfate is added dropwise with vigorous stirring; the mixture is extracted with toluol and the extract dried; addition of petroleum ether gives crystals which on recrystallization from n-hexane, yield 8 g. of the compound sought, melting at 110–110.5° C.

Example 6

2-phenyl 7-methyl 4,5,6,7-tetrahydro indazolone-3

13.6 g. 3-methyl 2-cyclohexanone 1-carboxylic ethyl ester (Kotz and Michels, Annalen 348, 94) is warmed with 8 g. phenyl hydrazine for several hours on a water-bath at about 100° C.; the liquid is cooled and a little alcohol and an excess of ether are added; the phenyl hydrazine precipitates out, is recrystallized from aqueous alcohol, and 5.5 g. thereof is dissolved in 15 g. toluol; 0.54 g. sodium is added; the mixture is refluxed for 5 hours, water is carefully added, and the aqueous layer is acidified with hydrochloric acid; the gummy precipitate, after drying, is crystallized from benzol, yielding 1.3 g. of the compound sought, melting at 176° C.

Example 7

1-bromallyl 2-phenyl 4,5,6,7-tetrahydro indazolone-3

10.7 g. 2-phenyl 4,5,6,7-tetrahydro indazolone-3 is dissolved in 30 cc. absolute alcohol containing 1.15 g. sodium; after the solution has cooled, 10 g. 2,3-dibromo propene is slowly added, the temperature being maintained at about 20° C. and stirring is continued for two hours thereafter; sodium bromide separates out; the mixture is allowed to stand overnight; the alcohol is distilled off under vacuum; more sodium bromide separates out; water is added to dissolve the sodium bromide; the oily reaction product is extracted with ether; the extract is dried, the solvent removed, and the residual brown oil repeatedly extracted with n-hexane; 11.3 g. of the compound sought is obtained as a clear straw-colored viscous liquid, which cannot be distilled, decomposing even at 0.5 mm. pressure, and which has resisted all attempts at crystallization from organic solvents.

By pursuing methods similar to those described above, various other indazolones are producible: thus, hydrogen at R may be converted into alkyls higher than ethyl or into alkenyls, by means of halides of such alkyls or alkenyls, as the bromide or iodide of propyl, butyl, amyl, or allyl, yielding, for example 1-propyl 2-phenyl 4,5,6,7-tetrahydro indozolone-3, 1-butyl, 2-phenyl 6-methyl 4,5,6,7-tetrahydro indazolone-3, 1-amyl 2-phenyl 5-methyl 4,5,6,7-tetrahydro indazolone-3, 1-allyl 2-phenyl 5-methyl 4,5,6,7-tetrahydro indazolone-3; and alkyls other than methyl may be provided at X, Y, and/or Z by suitably treating the corresponding alkyl cyclohexanone carboxylic ethyl esters—synthesized from the corresponding alkyl phenol, as the ortho-propyl, the meta-butyl, or the para-ethyl, phenol—, yielding, for example, 2-phenyl 7-propyl 4,5,6,7-tetrahydro indazolone-3, 1-methyl 2-phenyl 6-butyl 4,5,6,7-tetrahydro indazolone-3, 1-propyl 2-phenyl 5-ethyl 4,5,6,7-tetrahydro indazolone-3.

Indazolones of this invention are characterized by marked antipyretic activity.

It is to be understood that the foregoing embodiments are merely illustrative and by no means limitative of the invention, which may assume various other forms—as with respect to the particular indazolones prepared and the reactants and procedures employed—within the scope of the appended claims.

I claim:

1. 1-methyl 2-phenyl 4,5,6,7-tetrahydro indazolone-3.

2. 1-ethyl 2-phenyl 4,5,6,7-tetrahydro indazolone-3.

3. Indazolones of the general formula 1-alkyl 2-phenyl 4,5,6,7-tetrahydro indazolone-3.

4. Indazolones of the general 1-R 2-phenyl 4,5,6,7-tetrahydro indazolone-3, wherein R represents a radical of the group consisting of methyl, ethyl, propyl, butyl, amyl, allyl, and bromallyl.

JOHN LEE.